Aug. 30, 1966  E. G. DUERINGER ETAL  3,269,277
APPARATUS FOR PLACING CUT SHEETS IN PACKAGING FORMS
Original Filed Feb. 25, 1963  11 Sheets-Sheet 2
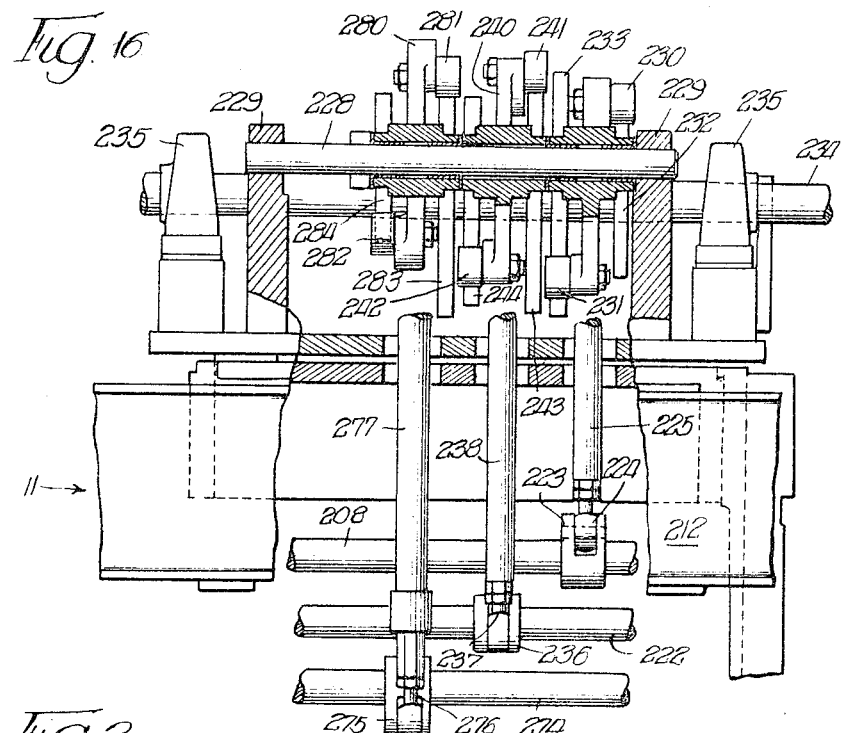
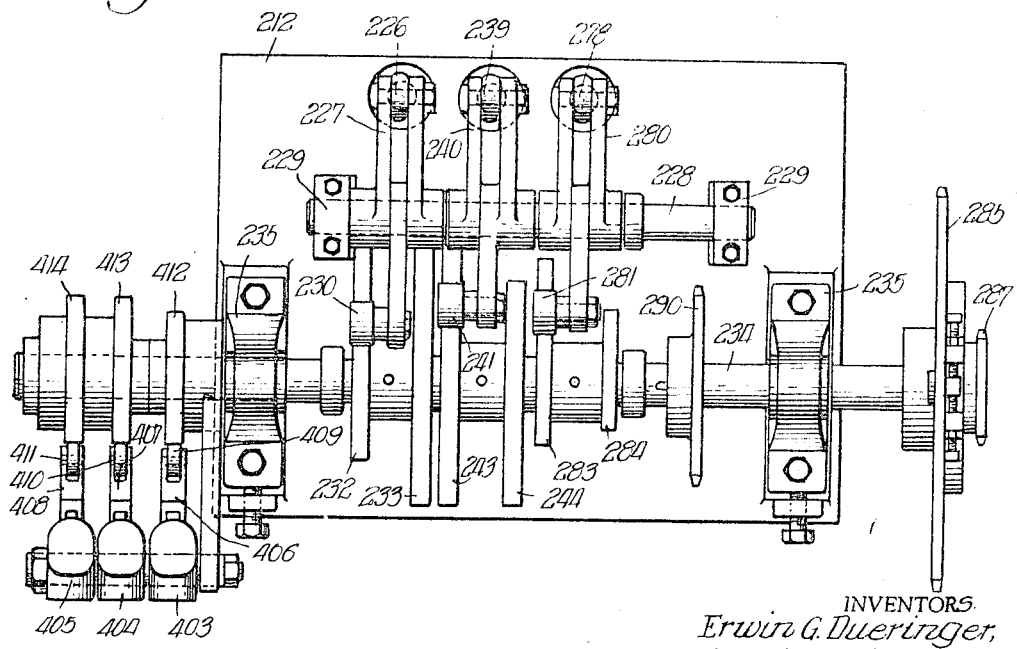
INVENTORS.
Erwin G. Dueringer,
BY Charles H. Johnson,

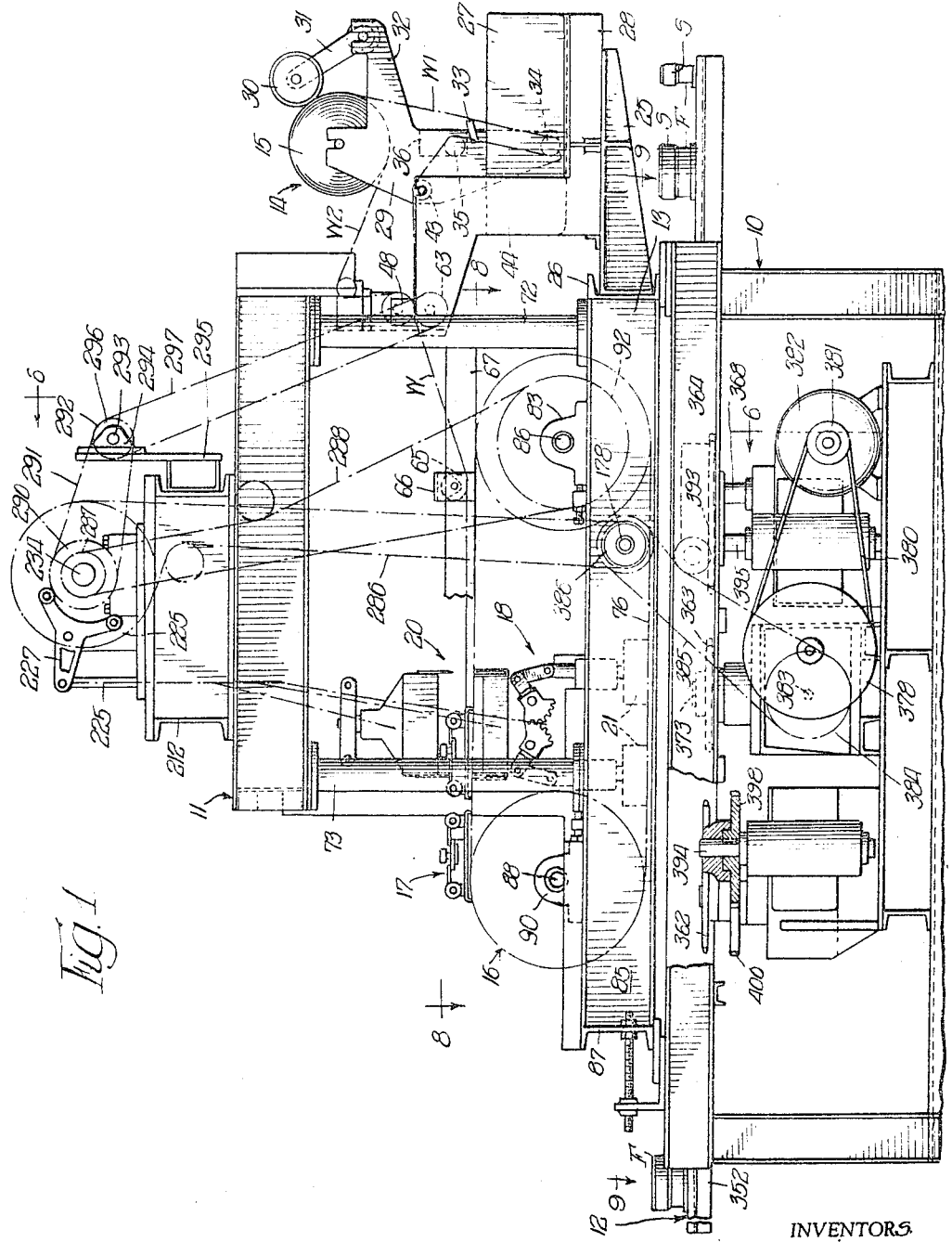

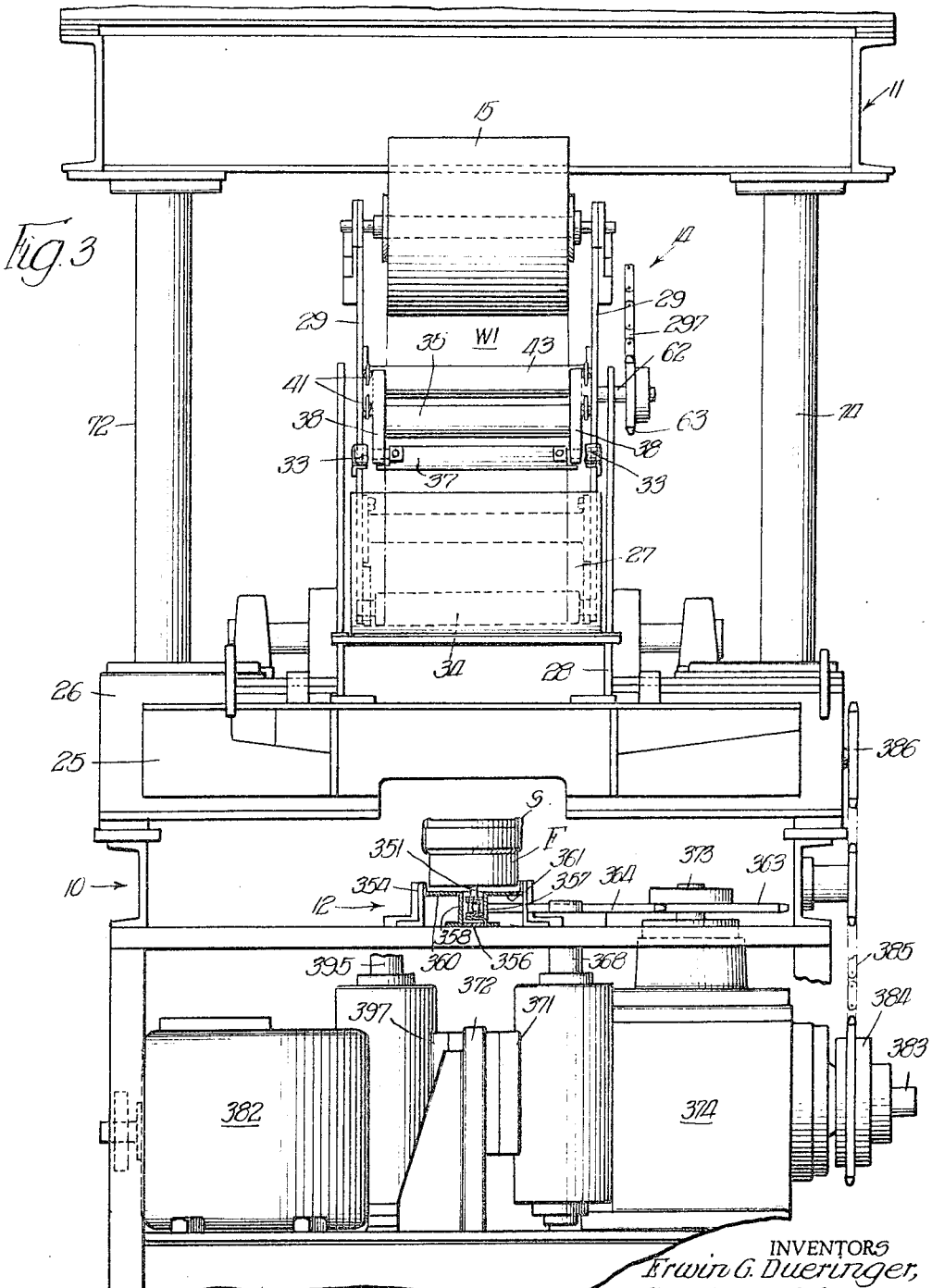

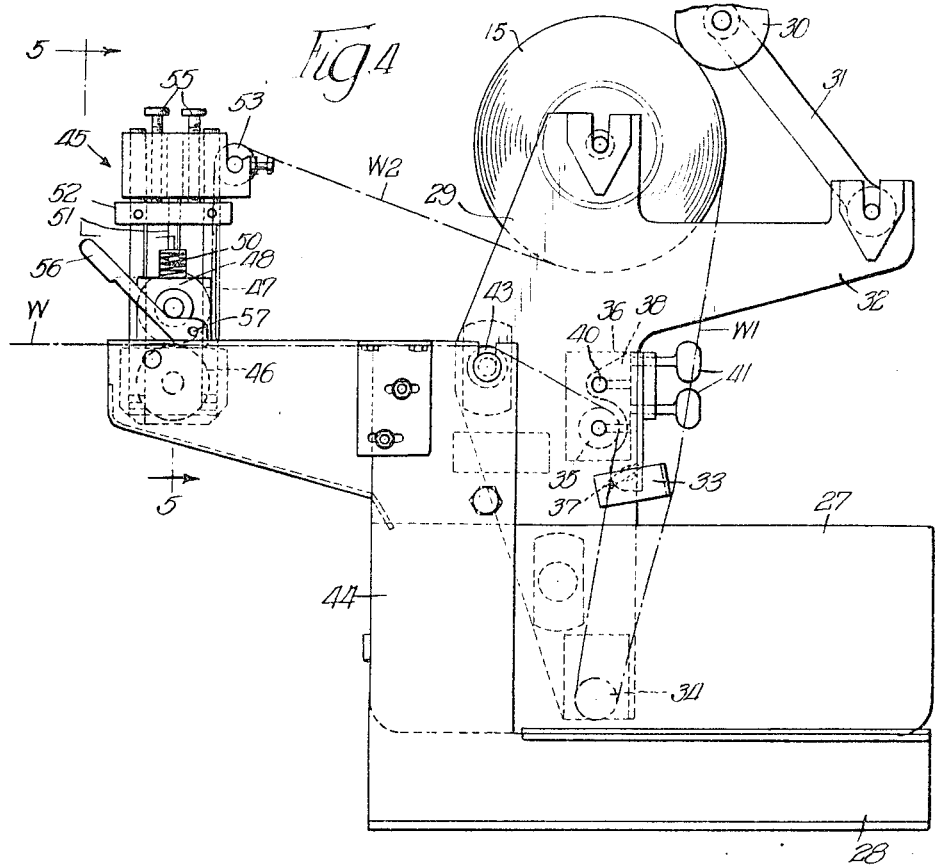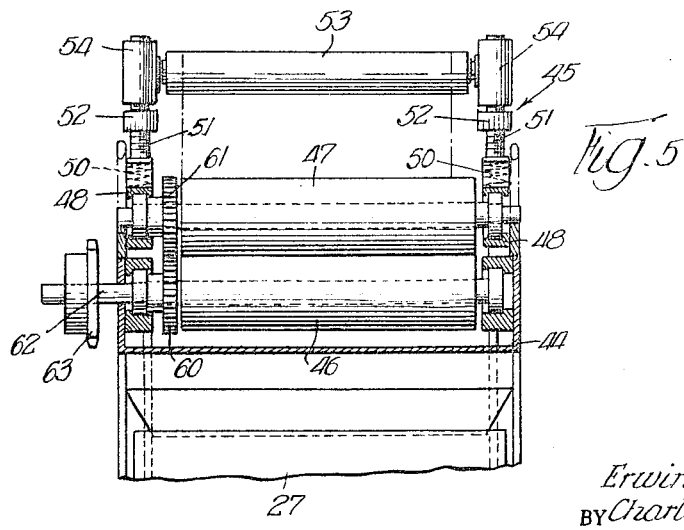

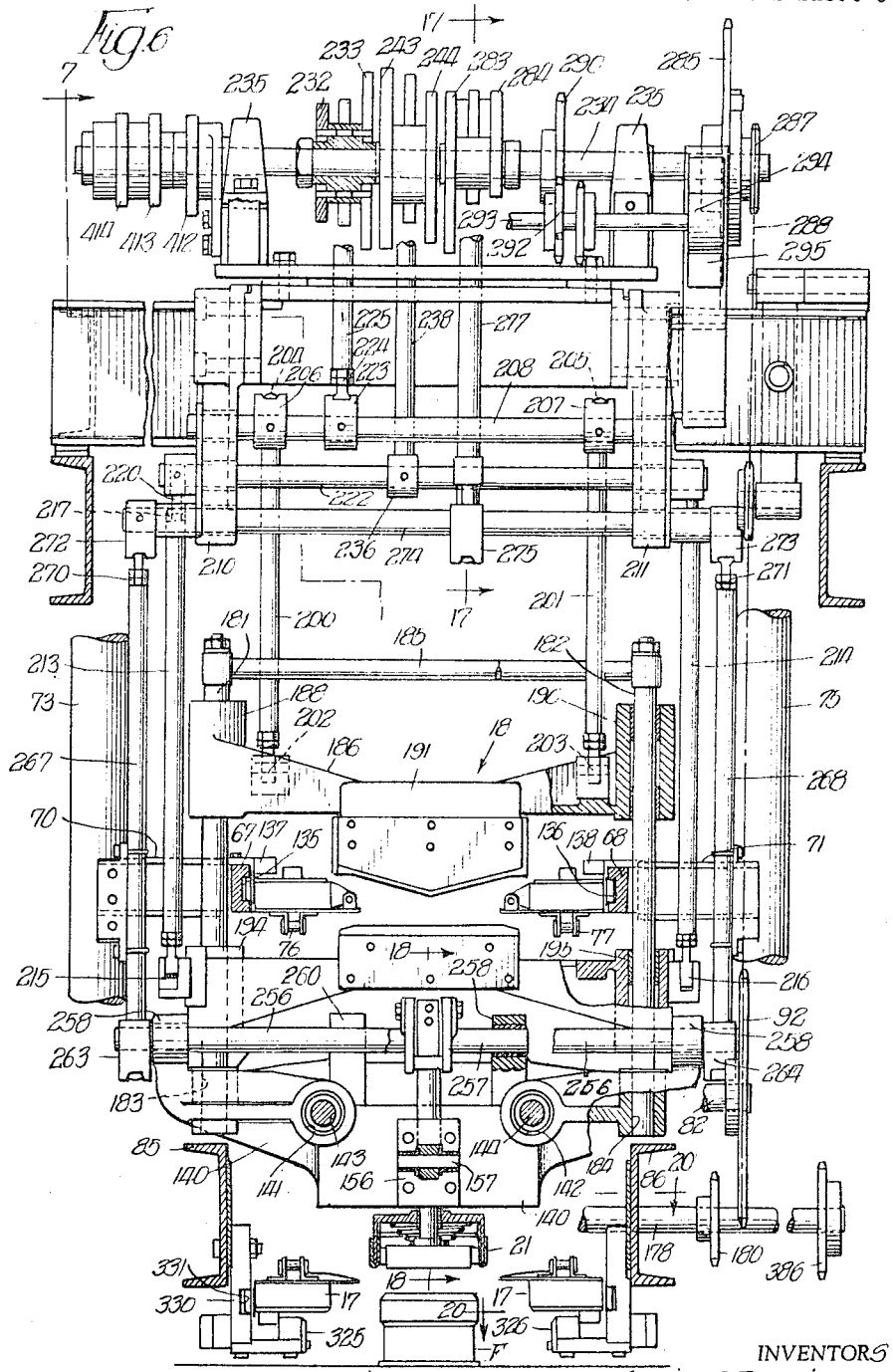

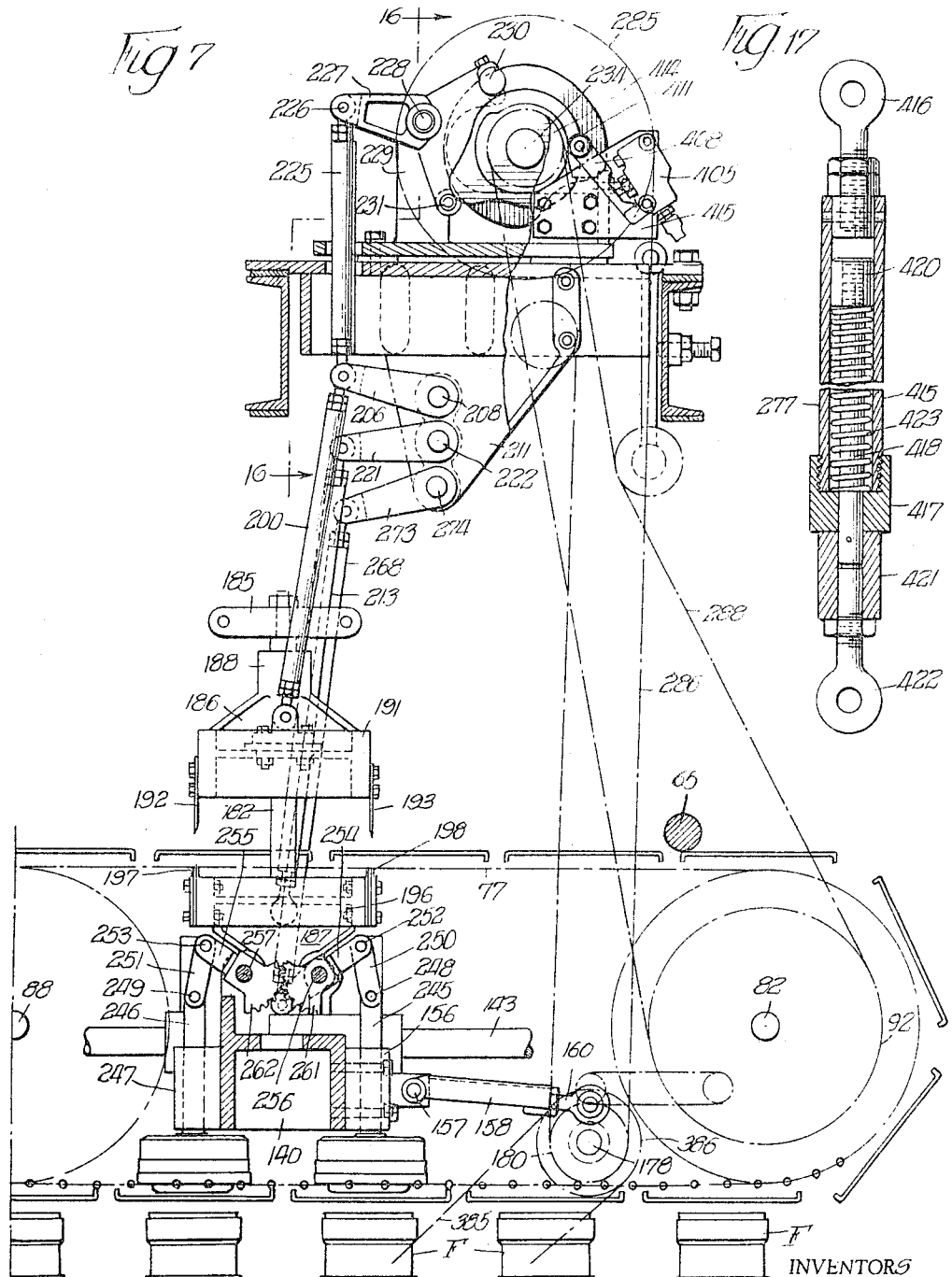

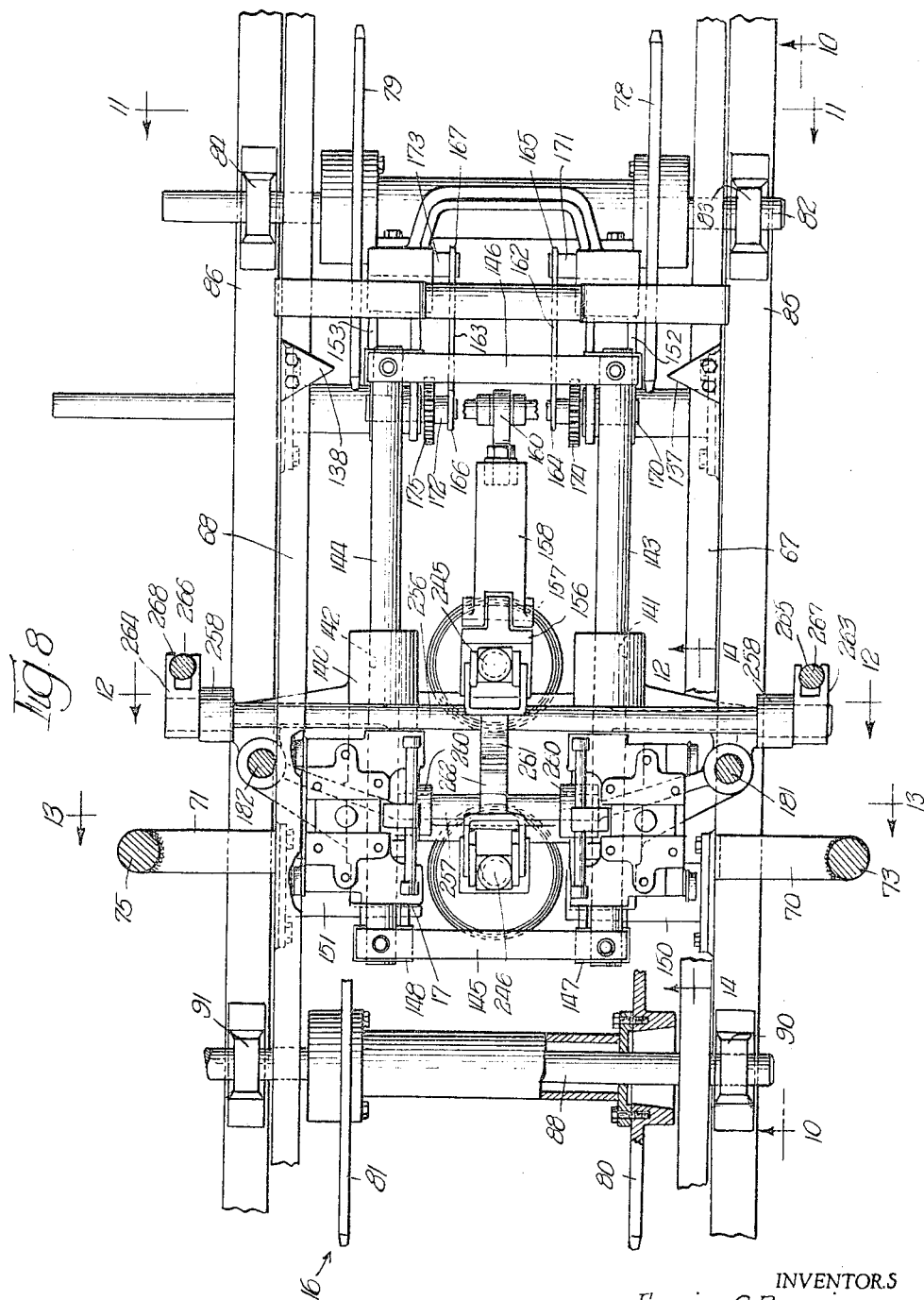

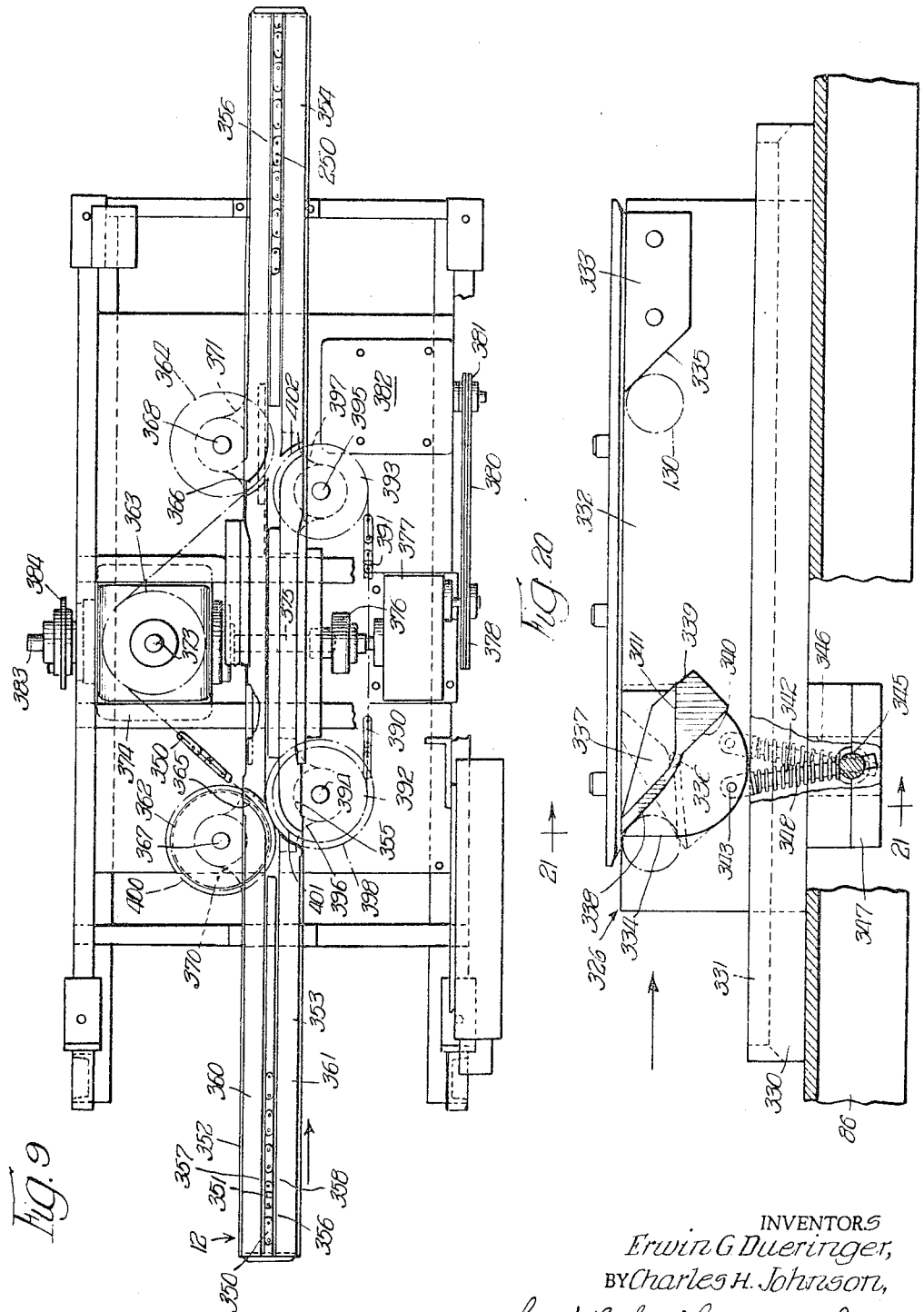

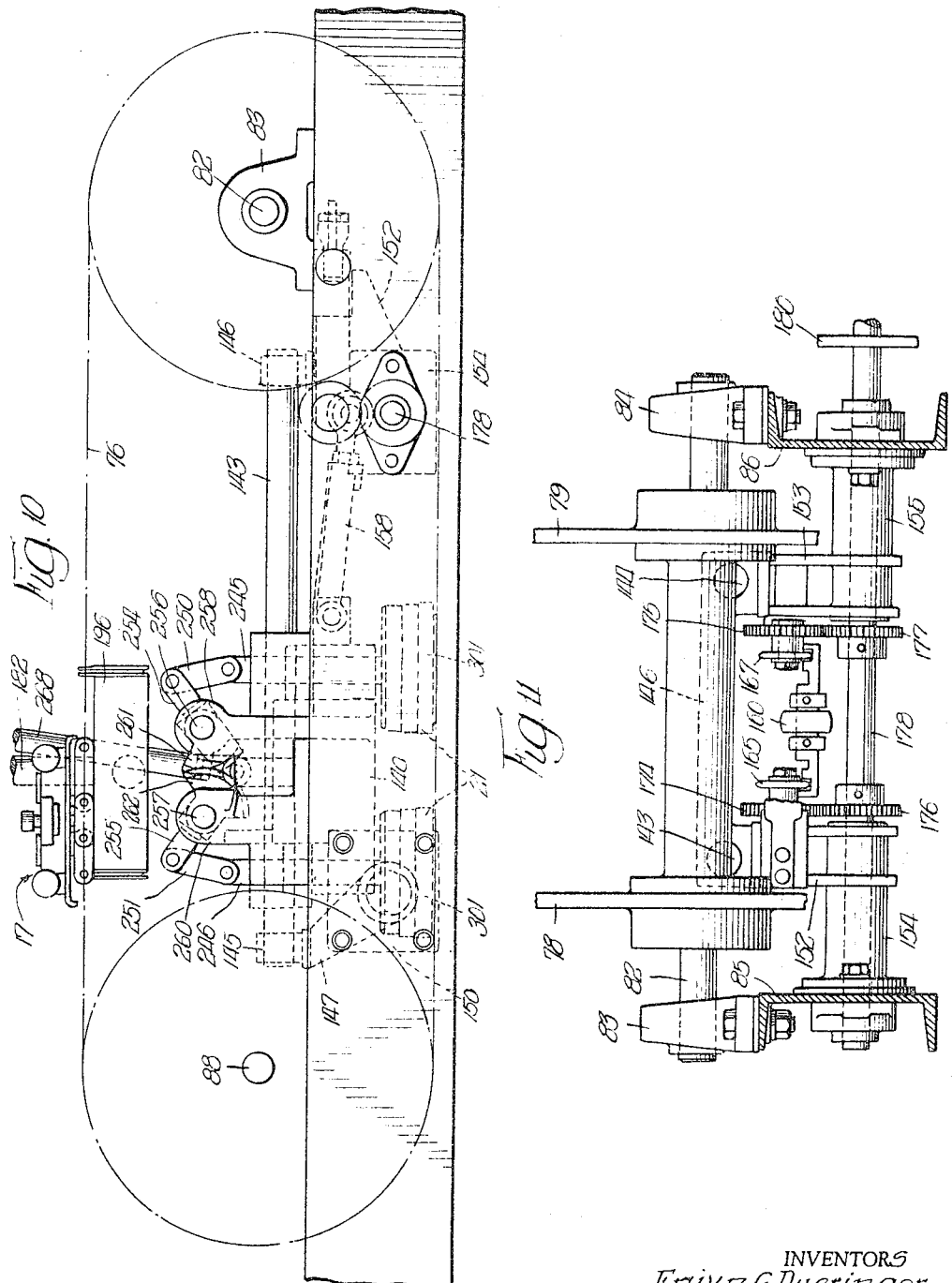

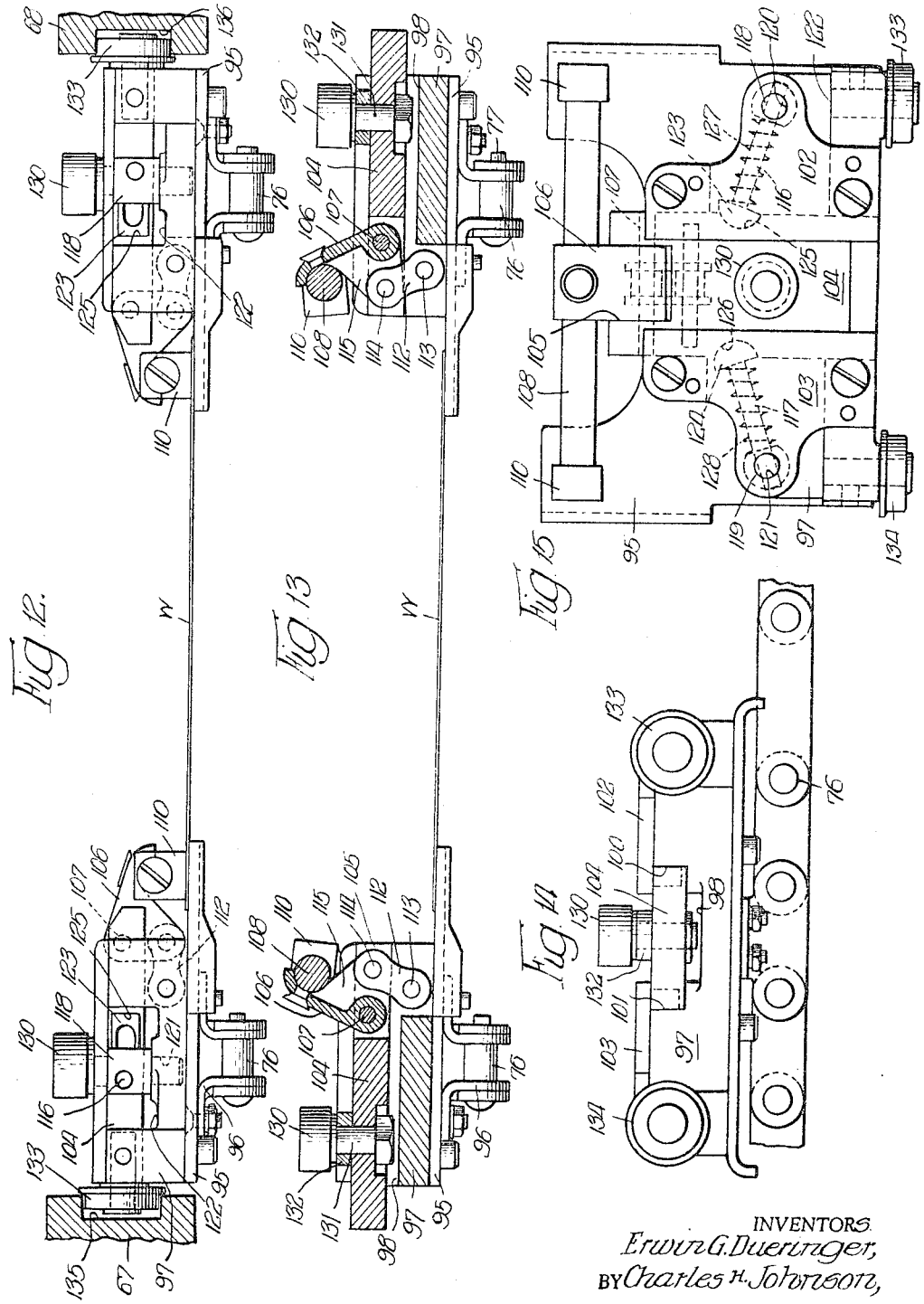

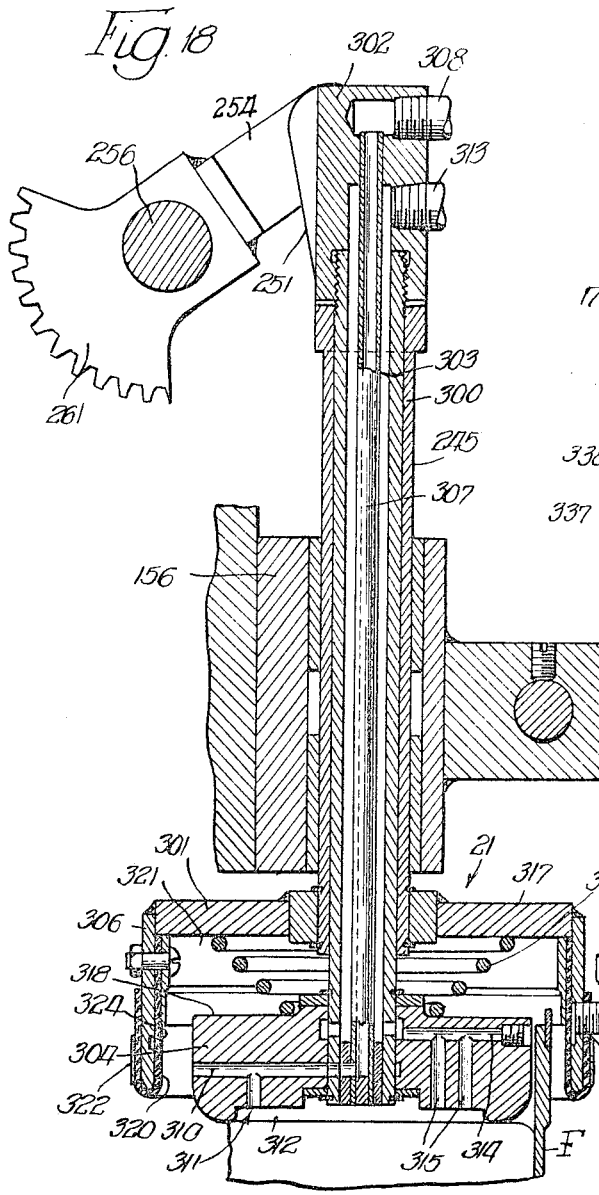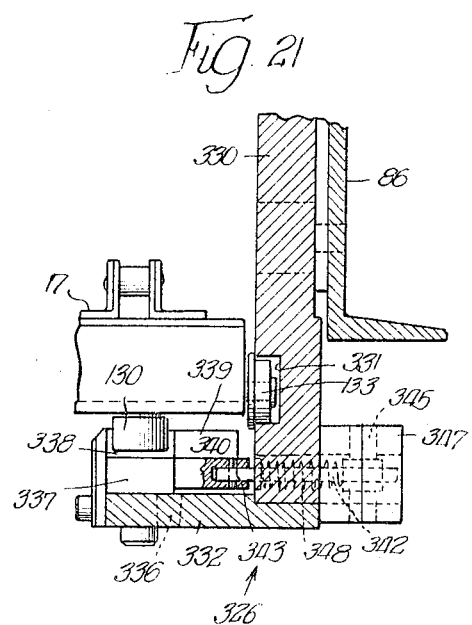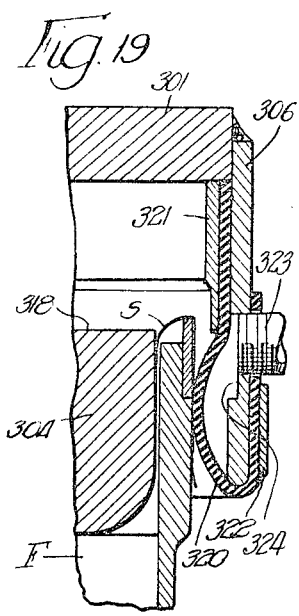

United States Patent Office 3,269,277
Patented August 30, 1966

3,269,277
APPARATUS FOR PLACING CUT SHEETS IN PACKAGING FORMS
Erwin G. Dueringer, Milwaukee, and Charles H. Johnson, Madison, Wis., assignors to Oscar Mayer & Co., Inc., Chicago, Ill., a corporation of Illinois
Original application Feb. 25, 1963, Ser. No. 260,553. Divided and this application May 25, 1965, Ser. No. 477,053
7 Claims. (Cl. 93—1)

This application is a division of Serial No. 260,553, filed February 25, 1963.

This invention relates to package forming and is more particularly concerned with improvements in apparatus for separating sheets of film material from a supply roll and placing the cut sheets in the open ends of hollow packaging forms which are conveyed through the apparatus.

One form of package which has been employed in the marketing of certain products, for example, sliced bologna, cheese and similar products which are used principally as luncheon items, a quantity or stack of slices of the product of predetermined weight is enclosed in a wrapper of transparent film material which has its edges crimp sealed between the edges of a narrow tubular sealing ring and a relatively flat metal closure plate which acts as a support for the package contents. A package of this type is disclosed in Seiferth Patent No. 2,787,552, dated April 2, 1957.

In the manufacture of the package of the type referred to, a supporting form of the type described in Seiferth et al. Patent No. 3,009,302, dated November 21, 1961, is employed to support the package elements during the assembly and sealing of the package. In assembling the package elements, the tubular sealing ring is initially placed on an external shoulder on the form and the wrapper sheet is cut and placed over the sealing ring and the open end of the form. The product is placed on the wrapper and pushed down into the form leaving the margins of the wrapper sheet extending over the top edge of the form and the sealing ring supported thereon. A metal closure member is then positioned on the assembly after which the form is carried through a canning machine where a crimped or rolled seam is formed by rolling down the edges of the closure member which traps the margins of the wrapper between the sealing ring and the closure member. Appropriate apparatus for carrying out the sealing operations is shown in Keating et al. Patent No. 3,025,943, dated March 20, 1962.

In the formation of this type package by previous method and apparatus hand operations have been employed in assembling the wrapper sheet and the other elements of the package in the supporting form preparatory to forming the seam which closes the package. It is an object of the present invention to eliminate part of the hand operations involved in the manufacture of this package by providing an apparatus for automatically cutting a supply web into sheets and placing the sheets in the open upper ends of the packaging forms after the sealing rings have been assembled with the forms.

It is a more specific object of the invention to provide an apparatus for feeding film material from a web supply, cutting the film into sheets of equal length, registering successive sheets over the open tops of a series of conveyor carried packaging forms and pushing the sheets into the hollow forms so that the margins of the sheet are left draped over the upper edges of the forms.

It is a still more specific object of the invention to provide an apparatus for feeding a two ply web of plastic film material from a supply roll, separating the plies of the web material and passing one of the plies through a treating bath, bringing the plies back together to form a double thickness, feeding the film material to a traveling conveyor where it is clamped along the side edges, cutting the film on transverse lines at longitudinally spaced points to provide individual package forming sheets which are advanced by the conveyor to a position in register with the open upper end of a hollow packaging form and releasing the sheets while forcing the center portions thereof into the forms so as to leave the margins of the sheets draped over the upper edges of the forms.

These and other objects and advantages of the invention will be apparent from a consideration of the apparatus which is shown by way of illustration in the accompanying drawings wherein:

FIGURE 1 is a side elevation of a machine for feeding packaging film material from a continuous web, cutting the advancing web into package forming sheets and placing the sheets in packaging forms which are passing through the machine, portions of the machine being shown schematically and other portions thereof being broken away or omitted;

FIGURE 2 is a partial top plan vew of the machine;

FIGURE 3 is an elevation at one end of the machine, to an enlarged scale and with portions broken away or omitted;

FIGURE 4 is a side elevation of the web feeding apparatus at one end of the machine, to an enlarged scale;

FIGURE 5 is a vertical transverse section, taken on the line 5—5 of FIGURE 4;

FIGURE 6 is a vertical transverse section taken on the line 6—6 of FIGURE 1, to an enlarged scale and with portions broken away or omitted;

FIGURE 7 is a vertical, longitudinal section taken on the line 7—7 of FIGURE 6, with portions broken away or omitted;

FIGURE 8 is a horizontal section, to an enlarged scale, taken on the line 8—8 of FIGURE 1, with portions broken away or omitted;

FIGURE 9 is a horizontal section taken on the line 9—9 of FIGURE 1, with portions broken away or omitted;

FIGURE 10 is a vertical longitudinal section taken on the line 10—10 of FIGURE 8 with portions broken away or omitted;

FIGURE 11 is a cross section taken on the line 11—11 of FIGURE 8, with portions broken away;

FIGURE 12 is a fragmentary cross section taken on the line 12—12 of FIGURE 8, to a larger scale;

FIGURE 13 is a cross section taken on the line 13—13 of FIGURE 8, to a larger scale;

FIGURE 14 is a fragmentary, vertical section taken on the line 14—14 of FIGURE 8;

FIGURE 15 is a plan view of one of the sheet clamping devices;

FIGURE 16 is a vertical section taken on the line 16—16 of FIGURE 7, to a larger scale and with portions broken away;

FIGURE 17 is a section taken on the line 17—17 of FIGURE 6, to an enlarged scale, and with portions broken away;

FIGURE 18 is a vertical section taken on the line 18—18 of FIGURE 6, to an enlarged scale;

FIGURE 19 is a fragmentary section, taken on the same plane as FIGURE 18 to a still larger scale;

FIGURE 20 is a horizontal section taken on the line 20—20 of FIGURE 6, to an enlarged scale; and FIGURE 21 is a cross section taken on the line 21—21 of FIGURE 20.

Referring first to FIGURES 1 to 3 of the drawings, the machine includes a supporting frame comprising a base 10 and a superstructure 11. The base 10 supports a conveyor assembly 12 on which the packaging forms F are carried through the machine in predetermined spaced relation. The superstructure 11 has a bottom frame 13 at one end on which a dispensing apparatus 14 for the package forming film material W is supported. The film W is fed from a supply roll 15 on the dispenser 14 to the top horizontal run of an endless conveyor mechanism 16 which carries a plurality of cooperating pairs of web gripper assemblies 17. A horizontally reciprocating carriage assembly 18 is mounted on the frame 13 which carriage has vertically reciprocating cutting knives 20 and a pair of sheet placing plungers 21 mounted thereon.

Briefly, the machine operates to feed the web W from the dispensing apparatus 14 to the side edge grippers 17 on the upper run of conveyor assembly 16. As the conveyor 16 advances the grippers 17 the web W is cut into sheets S of predetermined length by the reciprocating cutting knives 20 on the carriage 18. The sheets S are carried around the end of the conveyor assembly 16 into registry over the tops of packaging forms F which are carried on the conveyor 12 beneath the lower run of sheet conveyor assembly 16. The cutting of the sheets occurs while the carriage assembly 18 is traveling in one direction and a pair of the sheets are inserted in the open tops of a pair of forms F by operation of the plungers 21 while the carriage assembly 18 is traveling in the opposite direction. The cutting and placing of the sheets S and the advance of the forms F on the conveyor 12 are timed so that all movements are properly synchronized and successive pairs of sheets are properly placed in the packaging forms.

The film or web dispenser apparatus 14 (FIGURES 1 to 5) is mounted at one end of the machine on a horizontally extending bracket 25 which projects from a cross member 26 on the bottom frame 13 of the superstructure 11. An upwardly opening tank or tray 27 is mounted in a frame 28 which is seated on the bracket 25. The supply roll 15 of wrapping material is rotatably supported in bearings provided on the upper ends of a pair of upstanding, laterally spaced bracket plates 29 which extend upwardly of the side walls of the tank 27. A drag roller 30 for preventing overrunning of the roll 15 is supported on a frame 31 pivotally mounted on horizontal arms 32 extending from the support plates 29. The web material is furnished double ply on the supply roll 15 and the plies W1 and W2 are separated and advanced in different paths from the roll 15. The one ply W1 passes down over the edge of a U-shaped static eliminator bar 33 which is attached at its ends to the bracket plates 29. From the static eliminator bar 33 the web W1 advances into the tank 27 and around a guide roller 34 which is supported in journals near the bottom of the tank 27 so that the web W1 is fully immersed in the liquid in the tank. From the roller 34 the web passes upwardly to guide roller 35 which is journaled in a pair of support blocks 36 mounted on the bracket plates 29. The web W1 is engaged between the guide rollers 34 and 35 by a cross bar 37 which is pivotally mounted at its ends on the lower ends of a pair of small brackets 38. The brackets 38 have a pivotal connection at 40 with the bracket plates 36 and each bracket 38 has a pair of set screws 41 which are mounted therein with their free ends engaging a fixed portion of the bracket plates 36 so that the pivoted brackets 38 may be individually adjusted to tilt or tip the cross bar 37 and thereby control the path of the web W1. The web W1 passes from guide roller 35 over a guide roller 43 which is supported in upwardly opening bearing slots at the upper corners of vertical side wall portions 44 of the support frame 28 adjacent the forward end of the tank 27. The frame side walls 44 extend forwardly and support a pinch roll mounting frame 45 which carries a pair of cooperating web feed rolls or pinch rolls 46 and 47. The lower pinch roll 46 is journaled in a fixed position in the side of the supporting frame 45. The upper pinch roll 47 is journaled in a pair of bearing forming blocks 48 which are slidably mounted in the ends of the frame 45 and urged in a downward direction by springs 50. The springs 50 are seated at their lower ends in sockets provided in the uppermost faces of the bearing blocks 48 and at their upper ends on the lower ends of adjusting screws 51 which adjusting screws 51 extend in screw threaded engagement in vertical bores provided therefor in tie bars 52 which are fixed on the frame 45. The upper pinch roll 47 is preferably metal surfaced while the lower roll is rubber covered. The pinch roll frame 45 also carries a guide roller 53 which is journaled in side bearing blocks 54 adjustably mounted on the top of the frame 45 and carrying adjusting screws 55 which engage at their lower ends with the fixed tie bars 45. The web ply W2 travels over the roller 53 and is recombined with the ply W1 at the pinch rolls 46 and 47. The bearing blocks 48 for the upper pinch roll 47 each carry a cam lever arm 56 which is pivoted thereon at 57 with a cam forming edge engaging the top edge of frame plate member 44 and which is adapted to be rotated to lift the pinch roll 47 for threading of the web plies W1 and W2 between the pinch rolls 46 and 47. Interengaging gears 60 and 61 are mounted at one side of frame 45 on the ends of the shafts of the rolls 46 and 47 so that the rolls rotate in synchronism when they are feeding the web W. The shaft 62 of the lower roll 46 is extended at the one end and carries a sprocket 63 which is connected with the main drive of the machine in a manner which will be described.

The recombined web W is advanced by the dispenser mechanism 14 beneath a guide roller 65 (FIGURES 1, 7 and 8) which is journaled in a pair of bearing forming brackets 66 mounted on longitudinally extending horizontal guide rails 67 and 68, the latter being supported by pairs of mounting brackets 70 and 71 extending from the vertical columns 72, 73 and 74, 75 at the four corners of the frame superstructure 11. The web W passes beneath the roller 65 and its side edges are engaged by the grippers 17 on the sheet conveyor 16 as the latter advance along the upper run of the conveyor.

The sheet conveyor 16 (FIGURES 1, 6, 7, 8 and 10) comprises a pair of laterally spaced endless chains 76 and 77 which are supported on pairs of end sprockets 78, 79 and 80, 81. The sprockets 78 and 79 are mounted on a cross shaft 82 which is journaled in bearings 83 and 84 mounted on the upper flanges of side frame members 85 and 86 which constitute part of the lower frame 13 of superstructure 11 and which extend in parallel relation longitudinally of the machine with each of the members made up of two spaced, oppositely facing channels and the members at one end being connected by the cross frame member 26 and at the other end by a cross frame member 87. The chain supporting sprockets 80 and 81 at the other end of the conveyor 16 are mounted on a cross shaft 88 which is journaled in bearings 90 and 91 also mounted on the frame side members 85 and 86. The shaft 82 carrying the sprockets 78 and 79 is extended at one end and carries a sprocket 92 which is connected in driving relation with the main drive of the machine in a manner which will be hereinafter described. The chains 76 and 77 of the conveyor 16 carry laterally aligned pairs of gripper assemblies 17 which are operated to grip the sides of the web W as the latter advances along the top run of the conveyor 16.

Each of the gripper assemblies 17 (FIGURES 1, 6, 8, 12, 13, 14 and 15) comprises a bottom or base plate 95 which is secured to its associated support chain by angle brackets 96 and which carries on its outermost face a body forming casting 97. The body member 97 has an upwardly opening slot 98 extending in the direction crosswise of the conveyor with the side walls of the slot rabbetted at 100 and 101 (FIGURE 14) so as to form with the overhanging margins of top cover plates 102 and 103 a guideway for a slide plate 104. The slide plate 104 is bifurcated at its inner end to provide a slot 105 in which an arm 106 is pivotally mounted on a cross pin 107. The arm 106 carries a clamp rod 108 at its free end which clamp rod has gripper pads 110 on the ends thereof positioned to seat, in one position of the arm 106, on the inner margin of the bottom plate 95 for gripping relation with the web W (FIGURE 12). A link 112 is connected at its one end by the pivot pin 113 to the base 97 within a forward end extension on the slot 98. At its other end the link 112 is pivoted at 114 to a boss 115 on the arm 106. The pivots 107, 113 and 114 are so related that movement of the slide plate 104 causes swinging movement of the arm 106 to raise and lower the clamp arm 108 in an arcuate path between the web clamping or closed position of FIGURE 12 and the web releasing or open position of FIGURE 13. Latching mechanism is provided for holding the slide plate 104 in its two positions which comprises a pair of latch pins 116 and 117 slidably mounted in guideway forming bores extending transversely of the vertical axes of pivot pins 118 and 119 and in the top portions of the latter. The pivot pins 118 and 119 are pivotally supported in vertical position in sockets 120 and 121 provided therefor in the opposite ends of the upwardly opening slot 122 in the base or body member 97. The pins 116 and 117 have semi-circular heads 123 and 124 which are seated in socket forming complementary shaped recesses 125 and 126 in the side walls of the slide plate 104. Compression springs 127 and 128 are mounted on the pins 116 and 117 between the pivot pins 118 and 119 and the shoulder forming base portions of the heads 23 and 124 thereof. The pins 116 and 117 are mounted so that they are adapted to assume inclined positions on either side of a center line connecting the axes of the pivot pins 118 and 119. The heads of the latch pins 116 and 117 move through the center line upon sliding movement of the plate 104 so as to lock the plate 104 in either retracted position as in FIGURE 13 or extended position as in FIGURE 12. The plate 104 carries a cam roller 130 which is mounted on the upper end of a vertical pin 131 and is held above the cover plates 102 and 103 by a spacer or washer 132. The cam roller 130 provides a means for opening and closing the clamping bar 108 in a manner which will be described. The gripper assemblies are held in horizontal position along the top run of the supporting conveyor 16 by guide rollers 133 and 134 on the outside face of the body member 97 which engage in guide grooves 135 and 136 (FIGURES 6 and 8) in guide rails 67 and 68 which extend along the top run of the conveyor 16. The guide rails 67 and 68 carry cam plates 137 and 138 for engaging the cam rollers 130 on the slide plates 104, to move the slide plates 104 inwardly of the supporting conveyor chains and close the clamping bars 108 so as to engage the margins of the web W as the conveyor 16 advances the gripper assemblies 17 to web cutting position within the operating area of the cutting knives 20 on the carriage assembly 18.

The carriage assembly 18 (FIGURES 1, 6 and 8) is reciprocated longitudinally of the machine in timed relation to movement of the conveyor 16 so that during a portion of each cycle of movement thereof it travels in the direction of the movement of the lower run of the conveyor 16 and during another portion of the movement thereof it travels in the direction of the movement of the upper run of the conveyor 16 so as to permit vertical reciprocation of the sheet placing plungers 21 and of the sheet cutting knives 20 in timed relation to movement of the conveyor. The carriage assembly 18 comprises a main frame forming casting 140 disposed at the bottom of the assembly and having parallel, longitudinally extending guideway forming bores 141 and 142 which receive parallel guide rods 143 and 144, the latter extending longitudinally of the machine and constituting ways upon which the carriage member 140 slides. The carriage supporting rods 143 and 144 are mounted at their opposite ends in the ends of cross bars 145 and 146. The cross bar 145 (FIGURES 8, 10 and 11) is seated at its ends on upwardly inclined brackets 147 and 148 which are secured to the inner ends of inwardly extending support brackets 150 and 151 which support brackets are in turn mounted on the side frame members 85 and 86. The cross bar 146 at the other end of the carriage supporting rods 143 and 144 has its ends seated on upwardly extending brackets 152 and 153 which extend upwardly of the inner ends of the journal forming members 154 and 155, the latter being mounted on and projecting inwardly of the inner faces of the frame side members 85 and 86. The main carriage member 140 is connected by bracket 156 and pivot pin 157 with one end of a longitudinally disposed link 158. The link 158 has an adjustable eye 160 at its other end which is pivotally connected to a cross bar 161 extending between a pair of endless chains 162 and 163 which are supported in parallel, laterally spaced relation on longitudinally spaced pairs of sprockets 164, 165 and 166, 167. The sprockets 164 and 165 are mounted on the inner ends of stub shafts 170 and 171 which are journaled in longitudinally spaced relation in the bracket 152 at the one side of the machine. The sprockets 166 and 167 are supported on the inner ends of stub shafts 172 and 173 which are journaled in longitudinally spaced relation in the bracket 153 at the other side of the machine. The shafts 170 and 172 carry gears 174 and 175 which engage with gears 176 and 177 on a transverse drive shaft 178 which is journaled in the horizontally disposed brackets 154 and 155. The shaft 178 extends at one end to receive a sprocket 180 which connects the same with the main drive of the machine.

The carriage assembly 18 includes vertically disposed, transversely spaced rods 181 and 182 (FIGURE 6) which are seated in sockets 183 and 184 at opposite sides of the carriage member 140 and extend above the same to a rectangular top connecting frame 185. The frame thus formed provides a vertically extending support for the knife assembly 20 which comprises an upper carriage forming member 186 and a lower carriage forming member 187. The upper knife carriage 186 is provided at its opposite sides or ends with bearing forming portions 188 and 190 having vertical bores with bearing sleeves for slidingly mounting the carriage member on the vertical guide rods 181 and 182. The knife carriage 186 carries a rectangular blade holder or support 191 having a pair of blades 192 and 193 mounted on oppositely disposed vertical faces, the spacing of the blades being determined by the length of sheet of the wrapping material which the machine is designed to cut from the web W. The lower knife carrying carriage 187 is provided at its opposite ends with bearing forming portions 194 and 195 for receiving the vertical guides 181 and 182 in sliding relation therein. The knife carriage 187 supports a rectangular blade holder or support 196 having knife elements 197 and 198 on the oppositely disposed vertical faces which correspond to the blade supporting faces of the upper blade holder 191 so that the blades 192 and 193 are in parallel planes and cooperate with the blade elements 197 and 198, also in parallel planes, to sever the sheets from the web W when the knife carriages 196 and 197 are reciprocated toward each other. The uppermost knife carriage 186 is reciprocated by a pair of vertically extending links 200 and 201 which are pivotally connected at 202 and 203 at the ends or sides of the carriage 186 and which links have their upper ends pivotally connected at 204 and 205 with rocker arms 206 and 207 mounted on a rock shaft 208, the latter being journaled in laterally spaced, bearing forming brackets 210 and 211 supported in depending relation on the cross frame 212 forming the upper part of the frame superstructure 11. The lower knife carriage 187 is reciprocated by a pair of vertically extending links 213 and 214 which are pivotally connected at 215 and 216 at the ends or sides of the carriage 187 and which have their upper ends pivotally connected at 217 and 218 to rocker arms 220 and 221 on the rock shaft 222 which is also supported in the depending bearing brackets 210 and 211.

The rock shaft 208 carries a lever arm 223 which has its free end pivotally connected at 224 to the lower end of vertically extending link 225. The link 225 is pivoted at its upper end at 226 (FIGURE 7) to the free end of one arm of a Y-shaped cam follower 227 mounted on a cross shaft 228 (FIGURES 7 and 16). The cross shaft 228 for the cam followers is mounted at its ends in a pair of upstanding, laterally spaced bracket members 229 on the top of the uppermost support frame 212. The cam follower 227 carries on its other two arms cam rollers 230 and 231 which engage with the plate cams 232 and 233 on a driven cam shaft 234. The cam shaft 234 extends transversely of the frame 212 in parallel relation with the cross shaft 228 and is journaled in a pair of upstanding bearing members 235 on the frame 212. The rock shaft 222 carries a lever arm 236 pivotally connected at its outer end at 237 to the lower end of a vertically extending operating link 238 which has its upper end pivotally connected at 239 to a cam lever 240, pivotally mounted on the cross shaft 228. The cam lever 240 has cam follower rollers 241 and 242 which engage plate cams 243 and 244 mounted on the driven cam shaft 234.

The carriage assembly 18 also supports the vertically reciprocating sheet placing plungers 21. The placer plungers 21 which are of identical construction are mounted in spaced relation in the longitudinal direction of the machine for vertical reciprocation on the carriage member 140. The plungers 21 have vertically disposed stem members 245 and 246 which are slidably mounted on the carriage member 140. The stem member 245 of the one plunger is mounted in a sleeve bearing formation in the bracket member 156. The stem member 246 is mounted in a corresponding support member 247 on the opposite side face of the carriage member 140. The stem members 245 and 246 are pivotally connected at 248 and 249 to the lower ends of a pair of links 250 and 251 and these links are pivotally connected at their other ends at 252 and 253 to the ends of rock arms 254 and 255. The rock arms 254 and 255 are secured on a pair of parallel rock shafts 256 and 257 which are journaled in pairs of upstanding bearing forming bosses 258 and 260 on the top side of the carriage member 140. The bosses 260 are spaced apart a relatively short distance for supporting the short shaft 257 while the bosses 258 are at opposite sides or ends of the carriage member 140 for supporting the longer shaft 256. The rock arms 254 and 255 have interengaging gear segments 261 and 262 which cause the shafts to rotate in unison and in opposite directions when the longer shaft 256 is rotated. The shaft 256 carries rocker arms 263 and 264 (FIGURE 6) which are connected at their free ends at 265 and 266 to the lower ends of vertically disposed link bar members 267 and 268 for operating the shafts 256 and 257. The link bar members 267 and 268 are pivotally connected at 270 and 271 to rocker arms 272 and 273 on the rock shaft 274 which is journaled in the support brackets 210 and 211. The rock shaft 274 carries a lever arm 275 which is pivoted at 276 to a vertical link 277 having a pivotal connection at 278 with a cam lever 280 mounted on the shaft 228 and carrying the cam rollers 281 and 282 which engage with plate cams 283 and 284 on the cam shaft 234.

The cam shaft 234 carries a sprocket 285 (FIGURES 1 2, 6 and 17) at one end which is connected by the chain 286 with a sprocket 180 on the driven cross shaft 178, the latter being connected to the main drive for the machine. The cam shaft 234 also carries a smaller sprocket 287 which is connected by the drive chain 288 with the sprocket 92 on the cross shaft 82 for driving the conveyor 16. A third sprocket 290 on the cam shaft 234 is connected by the drive chain 291 with the sprocket 292 on a small cross shaft 293 which is supported in bearings 294 on brackets 295 extending from the frame 212. The sprocket 296 on the shaft 293 is connected by chain 297 with the sprocket 63 on the shaft 62 (FIGURES 1 and 4) of the lower pinch roll 46 of the web feeding mechanism 14.

The plunger mechanisms 21 are identical and only one of these mechanisms will be described in detail. The plunger stem 245 (FIGURES 7 and 18) is formed by an outer cylindrical member 300 and carries at its lower end a downwardly opening, cup-shaped boot carrying assembly 301. At its upper end a cap forming member 302 is screwed onto the threaded upper end of an inner tubular member 303 which slides within and extends through the bottom of the outer tube 300. The tubular member 303 carries at its bottom end plunger member 304, the external diameter of which is smaller than the internal diameter of the cup flange 306 of the assembly 301. A small tube 307, having a smaller external diameter than the internal diameter of tube 303, extends within the tube 303 and has a connection at the top of the cap 302 with an air line as indicated at 308. The bottom of the small inner tube 307 is plugged and connecting air passageways 310 and 311 provide outlets for air through the plunger member 304. The passageways 310 and 311 open on the periphery of the plunger member 304 and on the recessed bottom face 312. A plurality of these passageways 310 and 311 are circumferentially spaced about the plunger member 304. The external diameter of the small tube 307 relative to the internal diameter of the tube 303 is such that an axially extending passageway is provided between the tubes which opens on the recessed bottom face 312 of the plunger member 304 through passages 314 and 315 in plunger 304 and which is connected with a vacuum line as indicated at 313 so as to provide for application of vacuum to the recessed bottom face 312 upwardly through the tube 303. The plunger member 304 is urged in a downward direction relative to the cup 301 by a compression spring 316 extending between the base member 317 of the cup 301 and the uppermost face 318 of the member 304. The cup flange 306 carries a boot member 320 which comprises a cylindrical section of rubber or similar sheet material with one margin being reversely turned over the lower edge or rim of the flange 306. An inner clamping ring 321 clamps the boot to the inside of the cup 301 while an outer clamping ring 322 clamps the outer section of the boot to the outside of the margin of the flange 306. The boot 320 has a connection indicated at 323 with air and vacuum lines through a control valve. A groove 324 is provided on the inside surface of flange 306 to permit inflation and deflation of the boot for pressing or crimping the turned outer margins of the sheet against the surface of the top outer margin of the form F.

The carriage 18, the sheet cutting knife assembly 20 and the plungers 21 are operated in timed relation to the movement of the conveyor assembly 16. The sheet side edge grippers 17 are opened on the bottom run of the conveyor to release the sheets and then closed on the top run of the conveyor to grip the web W while it is cut into sheets. The gripper assemblies 17 are closed so as to grip the side edges of the web as it advances beyond the guide roller 65 by cam plates 137 and 138 engaging with the cam rollers 130 on the top of the respective gripper assemblies 17. The gripper assemblies 17 are opened for releasing the cut sheets S to permit placing thereof in the open upper ends of the forms F by cam release mechanisms 325 and 326 (FIGURES 6, 20 and 21) mounted on the side frame members 85 and 86. Since these mechanisms are identical except for being rights and lefts, only one will be described.

The cam control or tripping mechanism 326 is mounted along the lower run of conveyor chain 77 on a longitudinally extending, vertically disposed support and guide plate 330 which extends downwardly of the longitudinal frame plate 86. The vertical plate 330 has a longitudinal slot 331 to accommodate the rollers 133 and 134 on the end of the gripper assmblies 17. A support plate 332 extends inwardly of the bottom of the vertical plate 330 which carries a fixed trip member 333 and a pivotally mounted trip member 334 in longitudinally spaced relation. The trip members 333 and 334 are spaced apart a distance corresponding to the longitudinal spacing of the clamp assemblies 17 so as to operate two of these assemblies simultaneously, the plungers 21 being operable to simultaneously place two sheets in two spaced forms F on the form supporting and conveying assembly 12. The fixed trip member 333 has a tapered cam surface 335 which engages the cam roller 130 on a clamp assembly 17 and moves it outwardly of the machine to trip the clamp arm on the assembly and release the sheet. The other side of the sheet is released simultaneously by operation of the corresponding trip assembly 325 at the other side of the sheet carrying conveyor 16. The pivotally mounted trip member 334 is arranged to trip the following clamp assembly 17 and then reset for bypassing the next successive assembly 17. The member 334 is mounted on a vertical pivot 336 and has a base 337 and an upstanding roller engaging plate portion 338 with a tail portion 339, the latter having roller engaging surfaces 340 and 341. A latch device for holding the trip member 334 in either one of two positions comprises a pin 342 which is pivotally connected at 343 to the base portion 337 of the trip member 334 and which has its other end slidably mounted in a bore provided in a vertical pivot pin 345 supported in a slot 346 in a mounting block 347. A compression spring 348 is carried on the pin 342 between the pivot 345 at one end and a shoulder on the pin at the other end. The pivot points 336, 343 and 345 are so arranged relative to each other that when the trip member 334 is pivoted about the pivot point 336 between its two operative positions, the pivot 343 moves from one side to the other of dead center and the latch is effective to hold the trip member 334 in either the position shown in solid line in FIGURE 20 where it is set to engage with the roller 130 on the oncoming assembly 17 or the position shown in dotted line where it is set for the surface 341 to be engaged by the roller 130 so as to reset the trip for the roller 130 on the next assembly 17.

The forms F are fed through the machine below the conveyor assembly 16 by mechanism which changes the spacing between the forms as they enter the machine so that the center-to-center distance during their travel beneath the conveyor 16 corresponds with the center-to-center distance of the sheet clamping assemblies 17 and as the forms leave the machine with the sheets assembled therewith they are returned to their original spacing. The forms are carried through the machine by the conveyor assembly 12 (FIGURES 1, 3 and 9) which comprises an endless chain 350 having upstanding form engaging fingers or lugs 351 which are spaced apart a predetermined distance, for example, nine inches which is determined by other equipment operating on the forms. A chain guide or track assembly 352 forms a part of the conveyor assembly 12 and extends through the machine. The track assembly 352 is divided into infeed and outfeed end sections 353 and 354 and an intermediate section 355, the latter extending generally beneath the lower run of the conveyor assembly 16 where the forms are advanced with the spacing between successive forms being somewhat less, for example, 8¼ inches center-to-center, this spacing being determined by the length of film required for fabricating the package. The track assembly 352 is formed along the infeed section 353 and the outfeed section 354 to provide a center chain support rail 356 (FIGURES 3 and 9) flanked by vertically disposed, laterally spaced side wall members 357 and 358, and supporting rail members 360 and 361 having horizontal form supporting legs and upstanding edge flanges which form a guideway for the forms F with the traveling chain 350 riding in the upwardly opening slot provided between the side walls 357 and 358. As the chain 350 advances into the machine, it is diverted out of the track section 353 at the entrance end of the machine and then brought back into the track section 354 at the distance end of the machine. The chain 350 is supported in its diverted path by horizontally disposed sprockets 362, 363 and 364. The track sections 353 and 354 are slotted at 365 and 366 to accommodate the chain 350 and peripheral portions of the sprockets 362 and 364 which extend through the side wall 357 to engage the chain. The sprockets 362 and 364 are mounted on vertically disposed stub shafts 367 and 368 which are journaled in bearings 370 and 371 mounted on a center frame plate 372. The sprocket 363 is carried on the upper end of shaft 373 which extends into a gear box 374 which is connected by shaft 375 and a safety slip clutch 376 with a speed reducer 377, the latter having a pulley 378 on its input shaft which is connected by belt 380 with the output pulley 381 of a main drive motor 382 for the machine. The gear box 374 has a horizontal shaft 383 on which a sprocket 384 is mounted and connected by drive chain 385 with the sprocket 386 on the cross shaft 178, the latter driving the shaft 234 at the top of the machine.

The forms are carried through the intermediate section 355 of the track assembly 352 by an endless chain conveyor 390 having upstanding, form engaging fingers 391 spaced thereon. The chain 390 is mounted on the sprockets 392 and 393 which are supported on the upper ends of vertically disposed shafts 394 and 395, the latter being mounted by means of the bearing members 396 and 397 on the center frame plate 372. The shaft 394 carries a gear 398 which engages with the gear 400 on the shaft 367 so that the conveyor 390 is driven in unison with the chain 350. The track assembly 352 is slotted at 401 and 402 to accommodate the chain 390 and also to accommodate the sprockets 392 and 393. The forms F are advanced by the fingers 351 on the chain 350 to the intermediate section 355 of the track where they are picked up by the fingers 391 on the chain 390 and advanced to the sprocket 364 where the chain 350 returns to the outfeed portion 354 of the track assembly 352 and the forms are picked up by the fingers 351 and advanced out of the machine.

Air supply and vacuum lines are connected to the machine for operating the plunger mechanism through control valves 403, 404 and 405 (FIGURE 2) having operating arms 406, 407 and 408 with cam rollers 409, 410 and 411 engaging plate cams 412, 413 and 414 on the one end of the cam shaft 234. The valves are supported on a bracket assembly 415 adjacent the cam shaft 234. The valves 403 and 404 are connected to the lines 308 and 313 (FIGURE 18) while valve 405 is connected to the plunger boot at 323.

A safety feature of the mechanism is incorporated in the operating link 277 permitting that link to extend sufficiently to avoid damage if the forms F are improperly positioned beneath the plungers 21 so that the plungers strike the edges of the forms. Link 277 (FIGURES 6 and 17) comprises an outer cylinder 415 having a connecting eye 416 fastened in a plug in the one end thereof. An apertured spring retainer cap 417 is screwed on the other end. A guide rod 418 having an end section 420 of enlarged diameter at its inner end which is slidably received in the cylinder 415 extends at its other end through the axially extending aperture in the cap 417 and is connected by coupling 421 to a connecting eye 422. A compression spring 423 extends between the cap 417 and the end section 420 on the guide rod 418. With this construction the link will extend in length when the axial force exceeds the strength of the spring 423 which, of course, can be adjusted so as to avoid damage in the event a plunger encounters more than normal resistance against downward movement as by striking an improperly placed form F.

In using the machine, the film is fed from the roll 15 with plies W1 and W2 being separated and ply W1 being carried through an oil bath in the tank 27 after which the two plies W1 and W2 are recombined into the web W which is guided beneath the roller 65 and into the path of the gripper assemblies 17. Successive gripper assemblies 17 are closed on the side edges of the web W as they are advanced along the top run of the conveyor 16. The carriage 18 is longitudinally reciprocated and the knife assembly 20 is operated to cut the web into successive sheets as it advances along the top run of the conveyor. After the cutting of the web the plunger mechanisms 21 are reciprocated down and while they advance in register with the form in the direction of movement of the grippers on the lower run of the conveyor 16, they pick up a pair of sheets as the sheets are released by the grippers and place the sheets in the open ends of the forms F which have been advanced on the conveyor 12. The forms F are properly spaced by the spacing conveyor 390 so that they are aligned vertically with the plungers 21. In the operation of the plungers 21 the boot 320 is inflated as the plunger head moves into telescoping relation with the open upper end of the form so as to wipe the outer margins of the sheet down onto the outer face of the form. The boot 320 is deflated as the plunger is withdrawn so as to leave the sheet in position on the form.

We claim:

1. Apparatus for automatically placing package forming sheets in the open upper ends of hollow packaging forms comprising a reciprocating plunger assembly having a hollow stem and a downwardly facing cup-like member on the bottom end thereof, an inner slide member in said stem and a plunger head member on the bottom end of said slide member, said plunger head member and said slide member having passageways therein which are connected to a vacuum line whereby a sheet is held on said plunger head member when engaged thereby, means for delivering sheets beneath said plunger assembly, means for positioning packaging forms beneath said plunger assembly to receive the sheets, and means for reciprocating the plunger assembly to place successive sheets in the forms.

2. Apparatus as recited in claim 1 and said cup-like member having an expansible boot secured on the lower portion of the rim thereof and means for expanding the boot in the direction of said plunger head member to press the margins of the sheet against the outside surface of the form.

3. Apparatus for automatically placing package forming sheets in the open upper ends of hollow packaging forms comprising a reciprocating plunger assembly having a hollow stem and a downwardly facing cup-like member on the bottom end thereof, an inner slide member in said stem and a plunger head member on the bottom end of said slide member, said plunger head member being of a size to move within said cup-like member, a compression spring between said plunger head member and said cup-like member for normally holding said plunger head member in extended position, said plunger head member and said slide member having passageways therein which are connected to a vacuum line whereby a sheet is held by vacuum on said plunger head member when engaged thereby, means for delivering sheets beneath said plunger assembly, means for positioning cylindrical packaging forms beneath said plunger assembly which have an open top end of a size to receive said plunger head member, and means for reciprocating the plunger assembly to place successive sheets in the forms with the margins draped over the edges of the forms.

4. Apparatus as recited in claim 3, and said cup-like member having an expansible boot secured on the lower portion of the rim thereof and means for expanding the boot in the direction of said plunger head member to press the margins of the sheet against the outside surface of the form.

5. Apparatus as recited in claim 3, and said plunger head member having air passageways connected with an air line, and a control valve in said air line which is operative to supply air to the plunger head member for breaking the vacuum to release the sheets when the plunger head member is moved into a form.

6. Apparatus for automatically placing package forming sheets in the open upper ends of hollow packaging forms comprising a reciprocating plunger assembly having a hollow stem and a downward facing cup-like member on the bottom end thereof, a hollow inner slide member mounted in said stem and a plunger head member on the bottom end of said slide member, said plunger head member having peripherally spaced passageways connecting the interior of the slide member, a vacuum line connecting with said slide member and a control valve in said vacuum line, means to operate said control valve so as to hold a sheet on said plunger head member when engaged thereby, means for delivering successive sheets beneath said plunger assembly, means for delivering successive hollow packaging forms in upright position beneath said plunger assembly to receive the sheets, and means for reciprocating the plunger assembly so as to insert the plunger head member in the end of a form which is aligned beneath the same and to position said cup-like member in encompassing relation with the end of the form thereby to place a sheet in the form.

7. Apparatus as recited in claim 6 and said cup-like member having an expansible boot secured on the lower portion of the rim thereof and means for expanding the boot in the direction of said plunger head member to press the margins of the sheet against the outside surface of the form.

References Cited by the Examiner

UNITED STATES PATENTS

| | | | |
|---|---|---|---|
| 1,417,117 | 5/1922 | Tyler | 83—320 |
| 2,234,108 | 3/1941 | Carew | 93—51 |
| 2,562,475 | 7/1951 | Penkala | 83—320 |
| 2,565,319 | 8/1951 | Newman | 118—419 |
| 2,675,746 | 4/1954 | Conti | 93—1 |
| 2,860,553 | 11/1958 | Vogel | 93—1 |
| 2,871,773 | 2/1959 | Verrinder | 93—36.01 |
| 3,016,041 | 1/1962 | Oganowski et al. | 118—419 |
| 3,024,709 | 3/1962 | Clarice | 93—51 |

BERNARD STICKNEY, *Primary Examiner.*